REUBEN DANIELS.
Improvement in Churns.
No. 127,030.                    Patented May 21, 1872.
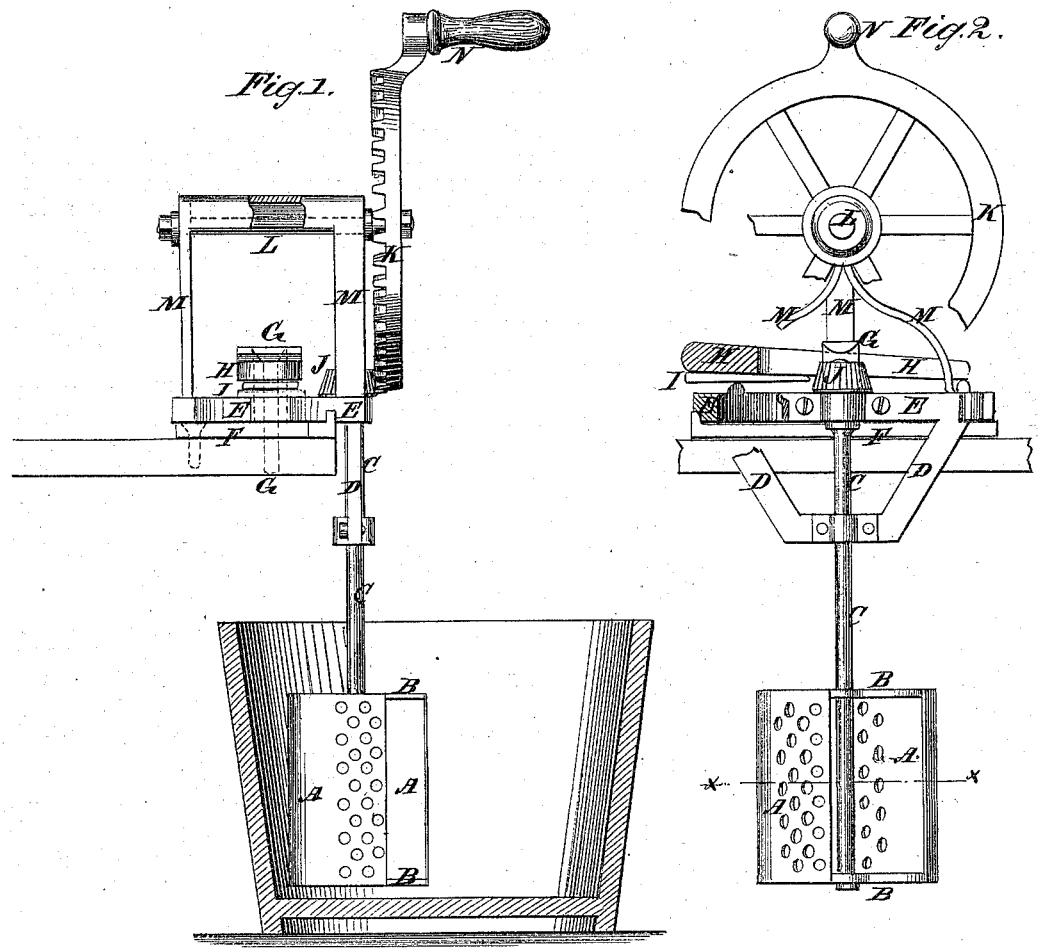
Witnesses:
John Becker.
Geo. W. Mabee
Inventor:
R. Daniels
Per Munn & Co.
Attorneys.

127,030

UNITED STATES PATENT OFFICE.

REUBEN DANIELS, OF WOODSTOCK, VERMONT.

IMPROVEMENT IN CHURNS.

Specification forming part of Letters Patent No. 127,030, dated May 21, 1872.

Specification describing a new and useful Improvement in Churning Apparatus, invented by REUBEN DANIELS, of Woodstock, in the county of Windsor and State of Vermont.

Figure 1 is a side view of my improved apparatus. Fig. 2 is a front view of the same, parts being broken away to show the construction. Fig. 3 is a detail cross-section of the dasher taken through the line $x\ x$ of Fig. 2.

Similar letters of reference indicate corresponding parts.

My invention has for its object to furnish a simple and convenient churning apparatus, which shall be so constructed that it will bring the butter in a very short time, and with a comparatively small amount of labor, and which shall at the same time be so constructed that it may be readily attached to the top of an ordinary table; and it consists in the construction of the dasher and of the frame-work, as hereinafter more fully described.

A are two floats, blades, or paddles, which are attached at their upper and lower ends to the ends of two arms, B, the centers of which are attached to the dasher-shaft or handle C. The floats A are made in about the form of sections of a hollow cylinder, and are attached to the ends of the arms B in such a position as to be eccentric with reference to the shaft C, as shown in Fig 3. The rear parts of the dasher-plates A are perforated with numerous holes, as shown in Figs. 1, 2, and 3. With a dasher thus constructed the shape and size of the vessel in which the milk is churned, and also the amount of milk churned at a time is entirely immaterial. The dasher should be arranged as close as practicable to one side of the churn, and as it is revolved the milk will be thrown into a strong steady current, sweeping around the outer part of the vessel or churn, which current, as it approaches the side of the vessel in which the dasher A B C is placed, will be cut up by the forward edges of the paddles A, and a large portion of the cream will be forced, by the centrifugal force engendered by the revolution of said dasher, out through the perforations of the said plates or paddles A, thus finely dividing it, breaking the butter sacs, and bringing the butter in a very short time. When the cream has been partly converted into butter the latter will pass between the plates A and shaft C, while the cream will continue to be acted on substantially as before. In other churns, whose dashers are also formed of curved plates, but not thus arranged to leave a space between them and the shaft, the butter and cream will, in practice, be carried around together, thereby frustrating the proper completion or perfection of the churning operation.

The dasher-handle or shaft C revolves in bearings in the vertical part D of the frame-work of the machine, which frame-work is made with a shoulder, offset, or horizontal part, E, to overlap the table-top and be secured to it. The offset E may be secured to the table-top by bolts, screws, clamps, or other means. The means shown in the drawing are very convenient. In this case a T-shaped iron bar, F, is secured to the table-top, which is provided with a cross-headed stud, G, formed upon or attached to it. A slot in the horizontal frame E is passed over the stud G, so that the said frame E may rest upon the T-bar F, where it is kept from lateral movement by lugs formed upon the ends of the bar F, and which enter notches in the ends of the frame E, as shown in Figs. 1 and 2.

H is a slotted bar, which is passed across the top of the frame E, astride of the stud G. A wedge, I, is then driven in between the slotted bar H and the frame E, forcing the said slotted bar H up firmly against the cross-head of the stud G, thus securing the frame-work D E firmly to the table, and at the same time in such a way that it may be easily and quickly detached when desired. To the upper end of the dasher-handle or shaft C is attached a small bevel-gear wheel, J, the teeth of which mesh into the teeth of the large bevel-gear wheel K attached to the end of a shaft, L, which revolves in brackets M attached to or formed upon the horizontal frame E. To the gear-wheel K is attached, or upon it is formed, the crank N, by which the apparatus is operated.

Having thus described my invention, I claim as new and desire to secure by Letters Patent—

1. The dasher formed of the vertical curved perforated plates A, attached to the arms B so as to leave a space between them and the shaft C and be eccentric thereto, substantially as and for the purpose specified.

2. The combination of the T-shaped bar F, cross-headed stud G, slotted bar H, and wedge I with each other and with the horizontal part or shoulder of the frame-work D E, substantially as herein shown and described, and for the purpose set forth.

REUBEN DANIELS.

Witnesses:
    JAMES T. GRAHAM,
    T. B. MOSHER.